April 25, 1939.  E. L. ANDERSON  2,155,631
BLOWER
Filed June 20, 1936  2 Sheets-Sheet 1

INVENTOR
Edward L. Anderson
BY
Andrew K. Fouda
his ATTORNEY

April 25, 1939.  E. L. ANDERSON  2,155,631
BLOWER
Filed June 20, 1936  2 Sheets-Sheet 2

INVENTOR
Edward L. Anderson
BY Andrew K. Fowler
his ATTORNEY

Patented Apr. 25, 1939

2,155,631

UNITED STATES PATENT OFFICE 2,155,631

BLOWER

Edward L. Anderson, Grosse Isle, Mich., assignor to American Blower Corporation, Detroit, Mich., a corporation of Delaware Application June 20, 1936, Serial No. 86,280

6 Claims. (Cl. 230—132)

My invention relates generally to blowers, and more particularly to the construction of the discharge outlet of blowers.

It is the principal object of my invention to increase the efficiency of an enclosed, wheel type blower.

Another object of my invention is to increase the discharge capacity of an enclosed blower in a manner such that substantially no air will be drawn by the blower, into the blower housing through the discharge outlet.

The invention consists in the improved construction and combination of parts, to be more fully described hereinafter and the novelty of which will be particularly pointed out and distinctly claimed.

In the accompanying drawings, to be taken as a part of this specification, I have fully and clearly illustrated my invention, in which drawings—

Figure 1:
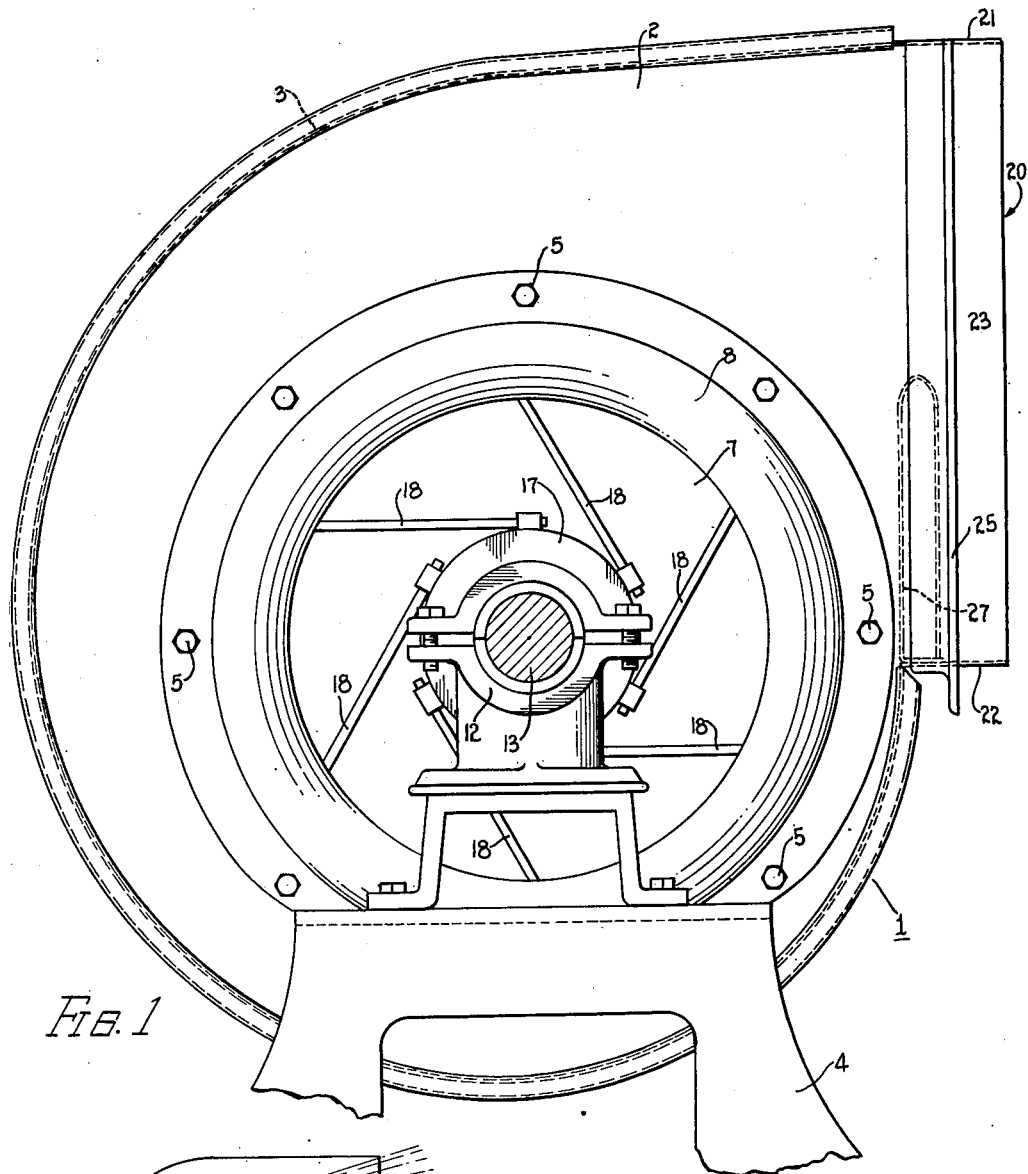
Figure 1 is a view shown in side elevation of a blower embodying my invention.

Referring to the drawings by characters of reference the numeral 1 designates in general a fan, or blower housing of the conventional scroll-shaped type formed by a pair of spaced, vertically extending, parallel side walls 2, and a wall formed by a sheet of metal 3 that wraps around and conforms in shape to the scroll-shaped peripheral edges of the side walls 2. The housing 1 may be supported on upright standards 4 that may be secured to the opposite side walls of the housing by bolts 5, or by other suitable means. In each of the opposite side walls 2 of the present housing there is provided an aperture or opening 7, and these openings 7 constitute the inlets for the entrance of air into the housing. The openings 7 are preferably circular in shape and in alignment, and in the present instance are defined by continuous flanges 8 that are formed out of the side walls 2. The continuous flanges 8 have outwardly bent continuous portions 9, and rebent inwardly extending portions 10 that position within the portions 9 and project into the housing 1.

Supported by the standards 4 on opposite sides and externally of the housing 1 there are bearing members 12 in which a shaft 13 is journaled for rotation, and is disposed with its axis of rotation in alignment with the inlet openings 7 in the side walls 2 of the housing. A wheel or drum type fan or blower 15 is disposed within the housing 1 and is mounted on the shaft 13 for rotation therewith. The shaft 13 may have one end coupled to the drive shaft of a suitable motor (not shown) for driving the blower 15. The present blower wheel comprises, in general, three spaced, circular ring-like members 16 secured to a hub 17 by spokes or tie-rods 18 and a plurality of spaced blades 19 that extend between, and are connected to, the circular ring-like members 16. The construction of this wheel type blower or fan is well known in the art to which this invention appertains.

Figure 2:
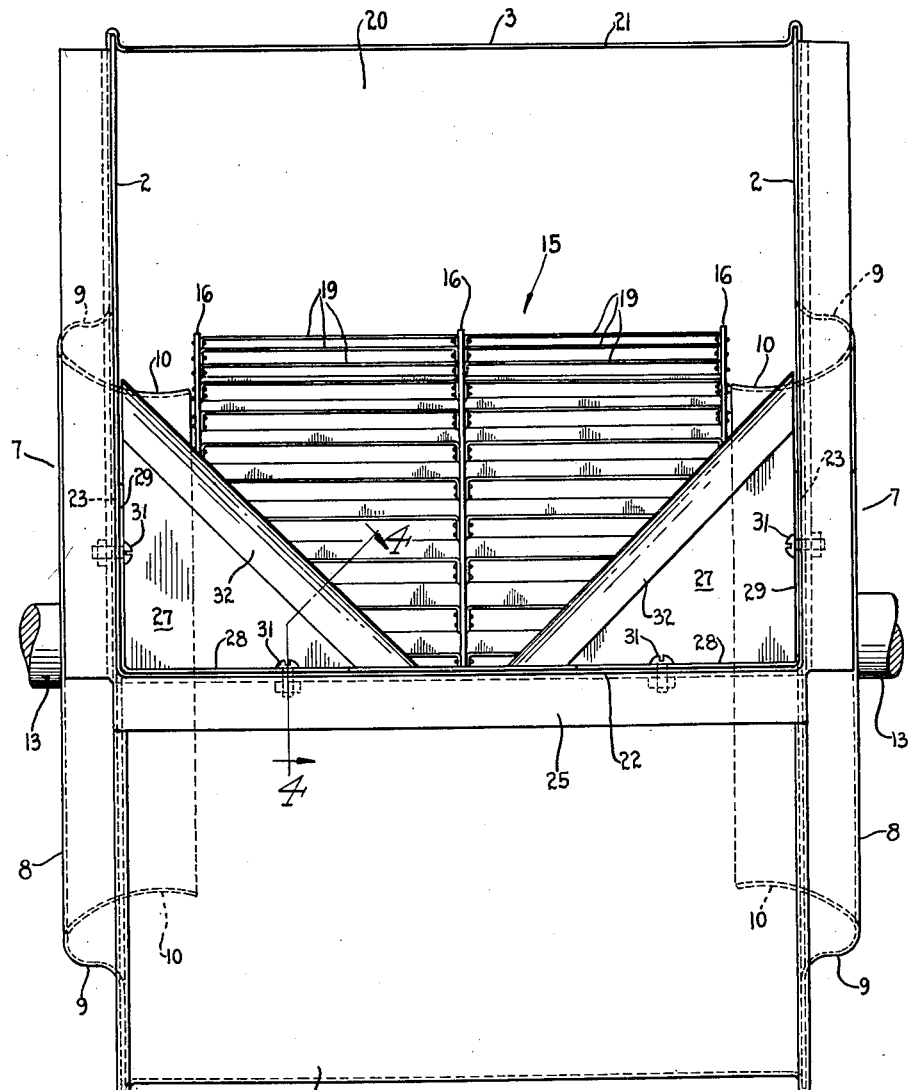
Fig. 2 is a front view of the blower shown in Fig. 1.

The opposite ends of the curved wall 3 terminate in substantially the same vertical plane at one end, or front of the housing 1, and cooperate with the side walls 2 to provide an air outlet or discharge opening 20 adjacent the top of the housing 1. The outlet 20 has its minimum flow area in a plane substantially tangent to and extending from the scroll end of minimum radius, see Fig. 1. The height or dimension of the opening 20 in the plane of minimum flow area is substantially equal to the diameter of the wheel 15 and when the wheel is viewed through opening 20 normal to the plane of minimum flow area, the opening 20 overlies substantially one quarter of the periphery of the wheel, see Fig. 2. In the present instance the curved wall 3 has top and bottom horizontally extending, outturned flange portions 21 and 22 respectively, that are joined at their end edges to the end edges of vertically and outwardly extending flange portions 23 of the side walls 2. The flange portions 21, 22 and 23 cooperate to define a passage for air and provide for coupling the housing 1 to an air conveying duct (not shown). Fitted over the bottom flange 22 and the side flange 23 there is a U-shaped flanged member 25 suitable for coupling the housing 1 to an air conveying duct (not shown).

Figure 3:
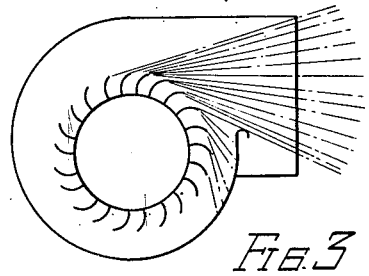
Fig. 3 is a diagrammatic view of a blower having a particular type of fan blade and showing the effect of the blade on the air.

As is well known, the efficiency of a blower or fan of the enclosed wheel type, as regards the amount of air discharged per unit of time, depends among other things upon the capacity or size of its discharge opening. It is also well known that in certain types of blowers, and particularly the type that operates at high speeds, the discharge opening is usually made smaller than full, or desired capacity in order to prevent air from being drawn into the blower housing through the lower region of the discharge outlet. Referring now to the diagrammatic view, Fig. 3, I have shown in this view a blower or fan of the wheel type having blades of a particular shape, and have indicated by lines how air is affected by these blades. The blades shown are of the curved type that curve from their longitudinal inner edges outwardly to their lead edges and in the direction of rotation of the blower. These blades are preferable for use on high speed blowers but because of their curvature a blower having blades of this type had, in the past, required a relatively small discharge opening compared to blowers using other types of blades, in order to prevent drawing air into the housing through the lower region of the discharge opening. That is to say, the blower cut-off partition had to extend well above the axis of rotation of the blower to obtain best results from the blower. Instead of pushing the air toward and through the outlet of a housing as other types of blades do, air is flipped off the curved blades and at the outlet the curved blades tend, more than other types of blades, to draw air back into the housing and create a low pressure area in the lower region of the housing between the ends of the blower wheel and the side walls of the housing. The tendency to draw air into the housing through the outlet is at the sides of the blower wheel, or adjacent the inlet openings 7. However, in the past, cut-offs for blowers have extended entirely across a lower portion of the discharge opening with the result that the capacity of the discharge opening was materially reduced with respect to full, or desired capacity.

Figure 4:
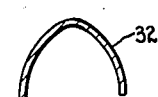
Fig. 4 is a view shown in cross section and taken along the line 4—4 of Fig. 2.

In order to obtain a relatively larger blower discharge opening, and in a manner so as to increase the efficiency of the blower, I provide a discharge opening defined by wall means including wall portions or baffles that extend from the sides of the housing and converge toward an apex below the axis, and substantially midway between the ends of the blower. To obtain this opening I prefer to employ angle shaped, plate-like corner pieces 27 positioned in the lower corners of the opening 20 to serve as cut-off members for the blower. The corner pieces 27 may be formed of sheet metal and their shape is preferably that of a 45° right angle triangle. Each of the triangular-shaped corner pieces 27 is formed having outturned flanges 28 and 29 extending along its base and vertical side edge, respectively. The horizontal flanges 28 of the corner pieces 27 seat on the horizontal flange 22 of the housing 1, and the vertical flanges 29 abut the inner side of the vertical flanges 23 of the housing. The flanges 28, 22, 29 and 23 and the U-shaped connecting member 25 may be provided with aligning apertures to receive screws 31 for securing the parts together. The third side of each of the triangular-shaped pieces 27, or hypotenuse, extends from a side wall of the housing 1, at a point slightly above the inlet opening 7 to the horizontal flange 22. The angularly extending sides, or hypotenuse of the cut-off members 27 cooperate to define a V-shaped opening having a downwardly directed apex. The edges of the angularly disposed sides of the corner pieces 27 are preferably curved outwardly, as at 32, Fig. 4, to induce crowding of air over these surfaces and through the discharge opening. The triangular-shaped corner pieces 27 substantially overlying the end portion of the blower wheel, adjacent the inlet openings 7, prevent the blower from drawing air back into the housing 1 between the ends of the blower wheel and the side walls of the housing. By constructing the discharge outlet of a blower housing as herein described, I have found that the efficiency of the blower is increased from approximately 67% to approximately 82%.

While I have herein shown and described a wheel type blower, or fan, having two inlets for the entrance of air, it is to be understood that my invention is equally applicable to the type of blower that has only one air inlet. It will be apparent that in a blower having a single air inlet that only one corner piece need be employed to close the space between the side wall in which the inlet is located and the adjacent end of the blower wheel for I have found, as previously pointed out, that the discharge opening of the blower need only be provided with a so-called cut-off overlying the above mentioned space. It will also be apparent in fans having a single air inlet that the size or capacity of the discharge outlet may be larger than in blowers having two inlets, since the desired capacity of the outlet will only be reduced by the use of one corner piece.

What I claim and desire to secure by Letters Patent of the United States is:

1. In a blower, a housing of scroll form having an inlet, a blower wheel in said housing, said blower wheel being arranged with one end thereof disposed toward said inlet and spaced from the housing wall having said inlet, an outlet opening in the scroll shaped wall of said housing, said outlet opening having a dimension transverse to the axis of rotation of the wheel substantially equal to the diameter of said wheel and overlying substantially one quarter of the periphery of said wheel, and wall means overlying the space between said one end of said blower wheel and said housing wall and overlying the periphery of one end portion only of said blower wheel, said wall means cooperating with said outlet opening to provide an opening of greatest effective discharge capacity without appreciable indrawing of air by said blower wheel through said outlet opening.

2. In a blower, a housing of scroll form having a side wall provided with an inlet, a blower wheel in said housing, said blower wheel being arranged with one end thereof disposed toward said inlet and spaced from said side wall, an opening in the wall of said housing spaced from and substantially parallel with a plane tangent to the periphery of said blower wheel, said opening having a dimension transverse to the axis of rotation of said blower wheel substantially equal to the diameter of said blower wheel, said opening overlying substantially one quarter of the periphery of said blower wheel, and wall means extending in the plane of said opening and overlying the space between said side wall and said one end of said blower wheel and overlying the periphery of an end portion only of said blower wheel to prevent indrawing of air through said opening by said blower wheel, said wall means cooperating with said opening to provide an air outlet of greatest effective discharge capacity.

3. In a blower, a housing of scroll form having side walls provided with inlets, a blower wheel in said housing, said blower wheel being arranged with its ends disposed one toward each of said inlets in spaced relation to the housing side walls, a rectangular shaped opening in the scroll shaped wall of said housing, said opening being spaced from and in a plane substantially parallel with a plane tangent to the periphery of said blower wheel, said opening overlying substantially one quarter of the periphery of said blower wheel and having a height substantially equal to the diameter of said blower wheel, and spaced triangular shaped corner pieces positioned in said opening, said corner pieces overlying the spaces between the ends of said blower wheel and the adjacent side walls of said housing and overlying end portions of the blower wheel to minimize indrawing of air into said housing through said opening by said blower wheel, said corner pieces cooperating to form in part a discharge outlet of greatest effective discharge capacity.

4. In a blower, a housing of scroll form having side walls provided with inlets, a blower wheel in said housing, said blower wheel being arranged with its ends disposed one toward each of said inlets in spaced relation to the housing side walls, a rectangular shaped opening in the scroll shaped wall of said housing, said opening being spaced from and in a plane substantially parallel with a plane tangent to the periphery of said blower wheel, said opening overlying substantially one quarter of the periphery of said blower wheel and having a height substantially equal to the diameter of said blower wheel, and spaced triangular shaped corner pieces positioned in said opening, said corner pieces overlying the spaces between the ends of said blower wheel and the adjacent side walls of said housing and overlying end portions of the blower wheel to minimize indrawing of air into said housing through said opening by said blower wheel, said corner pieces cooperating to form in part a discharge outlet of greatest effective discharge capacity, edges of said triangular shaped corner pieces forming in part said discharge opening and being rounded to obtain a dam effect to minimize noise of discharging air.

5. In a blower, a housing of scroll form having a side wall provided with an inlet, a blower wheel in said housing, said blower wheel being arranged with one end thereof disposed toward said inlet to draw air into said housing and spaced from said side wall, a rectangular shaped outlet opening in the scroll shaped wall of said housing, said outlet opening having the desired discharge area with respect to said blower wheel, said outlet opening overlying substantially one quarter of the periphery of said blower wheel and overlying the space between one end of said blower wheel and said side wall, said outlet opening having a height substantially equal to the diameter of said blower wheel, and a triangular shaped corner piece positioned in said outlet opening, said corner piece overlying the space between said one end of said blower wheel and said side wall and overlying an end portion of the periphery of said blower wheel, said corner piece cooperating with the wall defining said outlet opening to provide the largest effective discharge outlet without appreciable indrawing of air through said outlet opening by said blower wheel.

6. In a blower, a housing of scroll form having side walls provided with inlets, a blower wheel in said housing, said blower wheel being arranged with its ends disposed one toward each of said inlets in spaced relation to the housing side walls, a rectangular shaped outlet opening in the scroll shaped wall of said housing, said opening being spaced from and in a plane substantially parallel with a plane tangent to the periphery of said blower wheel, said opening overlying substantially one quarter of the periphery of said blower wheel and having a height substantially equal to the diameter of said blower wheel, and corner members positioned in the corners of said opening adjacent the wheel axis and having diverging air flow edges curved in the direction of air flow, said corner members overlying the spaces between the ends of said wheel and the adjacent housing side walls and also overlying end portions of the wheel to substantially eliminate indrawing of air into said housing through said opening.

EDWARD L. ANDERSON.